April 21, 1964 P. BERGER 3,129,460
EXTRUSION APPARATUS HAVING CONE-SHAPED ROTOR MEANS
Filed Sept. 18, 1961 4 Sheets-Sheet 2

INVENTOR,
PIERRE BERGER
WENDEROTH, LIND & PONACK
ATTORNEYS

April 21, 1964    P. BERGER    3,129,460
EXTRUSION APPARATUS HAVING CONE-SHAPED ROTOR MEANS
Filed Sept. 18, 1961    4 Sheets-Sheet 3

INVENTOR.
PIERRE BERGER
WENDEROTH, LIND & PONACK,
ATTORNEYS

April 21, 1964     P. BERGER     3,129,460
EXTRUSION APPARATUS HAVING CONE-SHAPED ROTOR MEANS
Filed Sept. 18, 1961     4 Sheets-Sheet 4

INVENTOR,
PIERRE BERGER
WENDEROTH, LIND & PONACK
ATTORNEYS

United States Patent Office 3,129,460
Patented Apr. 21, 1964

3,129,460
EXTRUSION APPARATUS HAVING CONE-SHAPED ROTOR MEANS
Pierre Berger, Firminy (Loire), France, assignor to Compagnie des Ateliers et Forges de la Loire (St. Chamond-Firminy-St. Etienne-Jacob-Holtzer), Paris, France, a society of France
Filed Sept. 18, 1961, Ser. No. 138,819
Claims priority, application France Sept. 23, 1960
8 Claims. (Cl. 18—12)

This invention relates to extrusion apparatus and more especially to apparatus for extruding thermoplastic materials, such as polyethylene, polystyrene, cellulose acetate, polyvinyl chloride, and other materials possessing a visco-elastic consistency or to which such a consistency may be imparted by heating or otherwise.

A known form of extrusion apparatus essentially comprises a recessed casing having an inlet for supplying material to be extruded into the casing, an extrusion orifice formed in the casing wall at a point spaced from the inlet, and a rotor member mounted for rotation within the recess so as to mill the material while propelling it under pressure from the inlet to the extrusion orifice and through the latter out of the casing of the apparatus.

While apparatus of this kind works satisfactorily with many types of materials, experience has shown that its operation leaves somewhat to be desired with other materials of higher viscosity, or requires excessive amounts of plasticizing additions and/or excessively high temperatures to be practicable. It is therefore an object of this invention to provide improved extrusion apparatus of the general class specified above, which will permit of successfully extruding high-viscosity, or low-plasticity materials which were not amenable to treatment by similar apparatus of the prior art. Thus the improved apparatus will enable successful extrusion of vinyl chlorides having no or low plasticizer content, polycarbonates, polypropylene and other high-viscosity plastics.

Other objects of this invention are to improve the extrusion conditions over those prevalent in existing apparatus of the rotor type described, and more specifically to enhance the smoothness and uniformity of the extruded product through increasing the milling action to which the material is subjected prior to passing through the extrusion orifice, as well as increasing the heat exchange actions occurring between the material and the heating means usually provided in the apparatus.

Other objects will appear.

The invention is characterized, in an important aspect of it, in that there are provided at least two cooperating rotor members both jointly acting on the material as it passes from the inlet to the extrusion orifice, said rotor members being in the form or ruled surfaces of revolution, e.g. cones, or portions of hyperboloids of revolution, in substantially tangential relationship to one another, and arranged with their smaller ends or apices directed towards and positioned adjacent the extrusion orifice.

Exemplary embodiments of the invention will now be described for purposes of illustration but not of limitation with reference to the accompanying drawings, wherein.

Figure 1:
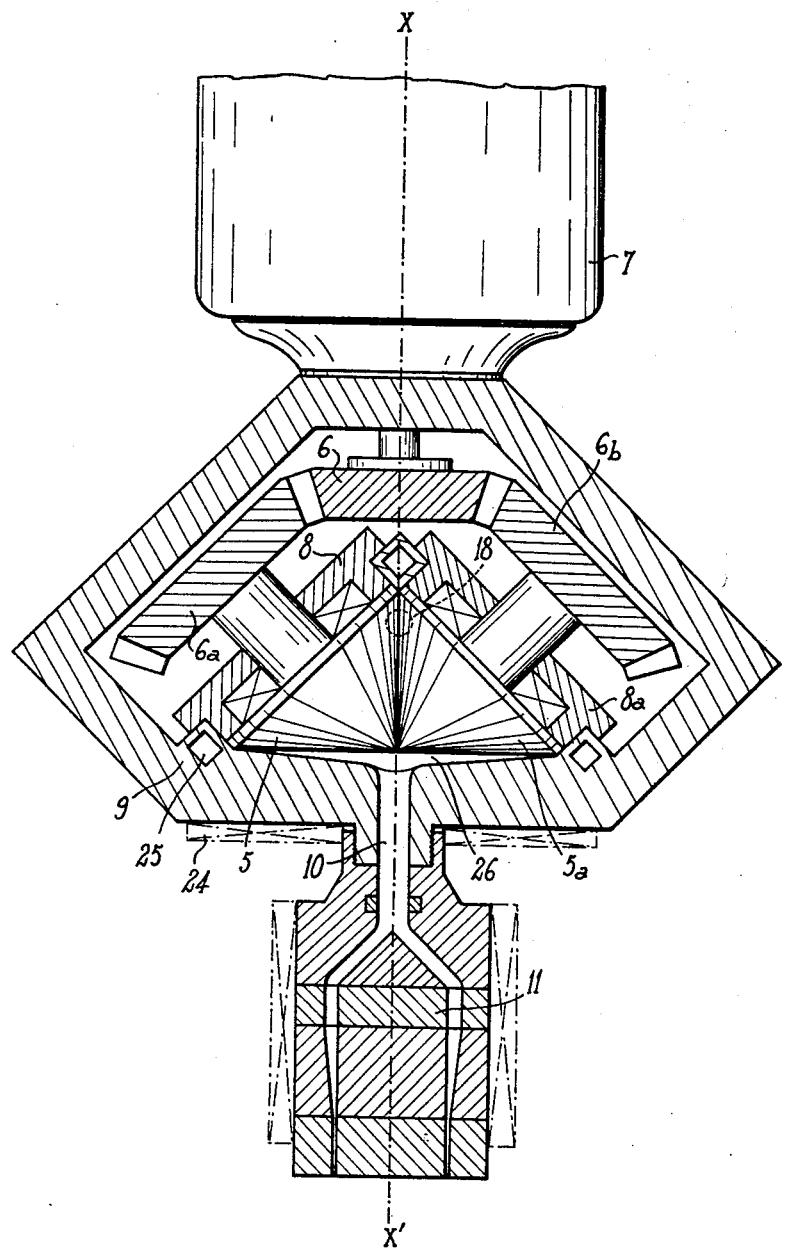
FIG. 1 is a view mostly in axial section of an improved extrusion apparatus wherein the rotor members are cones.

The improved extrusion apparatus illustrated in FIG. 1 comprises a recessed casing 9 having an inlet opening 18 formed in a side wall thereof, and an extrusion orifice 10 formed in its lower end wall. A die assembly 11 is shown connected with the bottom of the casing 9 preferably in a removable manner so as to enable the production of various shapes of extruded product as may be desired. Mounted for rotation within the casing 9 is a pair of similar rotor members 5 and 5a in the form of cones. The conical rotor members are here shown having 90° cone angles, and are positioned with their axes of rotation at right angles to each other, the two conical surfaces being substantially tangent to each other along a common generatrix extending along the vertical axis of symmetry XX' of the apparatus, as shown. Secured coaxially with each rotor member by way of an axial shank or shaft are related gears 6a and 6b respectively, both of said gears meshing with a common drive gear 6 journalled in the top of casing 9 and adapted to be driven in rotation from suitable means shown as an electric motor positioned in a housing 7 attached to the top of casing 9.

The conical rotor members 5 and 5a are positioned within respective cavities formed in the casing and having conical inner wall surfaces generally conforming with the outer surfaces of the respective members 5, 5a, said cavities intersecting each other in an area adjacent a common generatrix at which the rotor members 5 and 5a are substantially tangent to one another as stated above. Both said cavities moreover are connected with the common inlet opening or duct 18. While the inner surfaces of the stator cavities closely surround the respective rotor members 5 and 5a throughout the major areas of said inner surfaces, these surfaces are spaced away from the surfaces of the rotor members in the bottom of the casing 9 adjacent the extrusion orifice 10 to provide an annular space indicated at 26 to facilitate the flow of the extruded material towards and through the said orifice 10.

Preferably, means are provided for adjusting the axial positions of the rotor member 5 and 5a towards and away from each other, and said means are schematically indicated at 8 and 8a. Thus, an adjustable gap can be provided between the rotor members 5 and 5a in their common tangent area, for controlling the flow of extruded material towards the extrusion orifice 10. The rotor members 5 and 5a, therefore, are not necessarily tangent to one another in the strict sense of the word, and it would be more accurate, geometrically, to state that said members remain constantly tangent to a common cylinder of small radius coaxial with the symmetry axis XX'. It should be distinctly understood, accordingly, that where it is stated in the specification and claims that the rotor members are positioned in "substantially tangential relationship," or words to the same effect, such phrase is intended expressly to cover the condition where the two rotor members are separated by a small intervening gap, although they may be made truly tangent to each other by suitable adjustment.

Any suitable means of conventional nature may be provided for controlling the temperature of the material within the casing during the extrusion treatment. Such temperature controlling means may include electric heating resistors or coils mounted under the flat bottom wall of casing 9 as schematically indicated at 24, as well as ducts for cooling fluid formed through the casing walls as at 25.

In operation, plastic or other material to be extruded may be supplied into the casing through inlet duct 18 from any suitable source, and may be brought to a prescribed temperature in which the material is in a desired viscous or plastic condition by regulation of the temperature control means mentioned above. When the motor 7 is started in rotation, the similar conical rotor members 5 and 5a are driven at a common angular rate and in angular directions such that the adjacent portions of the respective cones in the near-contacting areas thereof move in opposite directions. The plastic material is thus subjected to an intense milling action as it progresses from the inlet 18 towards the extrusion orifice 10. Both the viscosity and the temperature characteristics of the material are thus rapidly uniformized and the extrusion proceeds more smoothly and at a higher rate than heretofore practicable. It has been found that the apparatus described makes it possible to extrude materials that could not heretofore be successfully extruded under similar conditions, or in fact extruded at all. Less plastifying additions and/or lower temperatures can be used.

Whereas the illustrated arrangement wherein the rotor members are rotated in such directions that adjacent points of their respective surfaces move in reverse directions has been found to be especially advantageous in that the material is subjected to a highly effective milling and shearing action as it progresses towards the extrusion orifice, it may in some cases be preferred to drive the rotor members in a manner such that said adjacent points move in a common direction, i.e. somewhat as though the two conical rotor members were rolling or meshing directly with one another. Such modifications are expressly contemplated within the scope of the invention.

Further, according to the invention the number of cooperating rotor members used is not necessarily restricted to two only. Thus FIG. 3 partly illustrates a modification utilizing three conical rotor members 12, 12a and 12b, arranged in a suitably shaped stator casing 13. The side members 12a and 12b are each in substantially tangential relationship with the central member 12 along opposite generatrices of the latter. In this example the central rotor member 12 may be directly driven from a motor, while the side members 12a and 12b may, as shown, be driven by means of gears secured to said respective side members and meshing with a central gear secured to rotor member 12.

Figure 4:
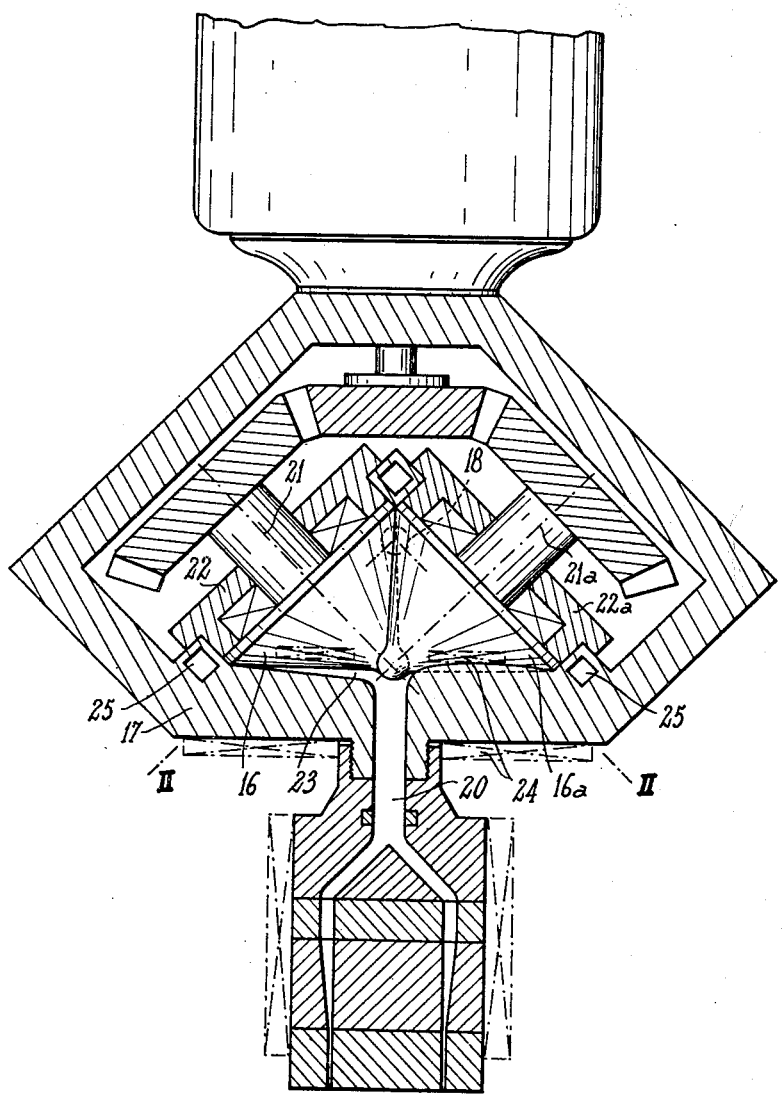
FIG. 4 is a view generally similar to FIG. 1 illustrating a modification of the invention wherein the rotor members are formed as portions of hyperboloids of revolution.
Figure 5:
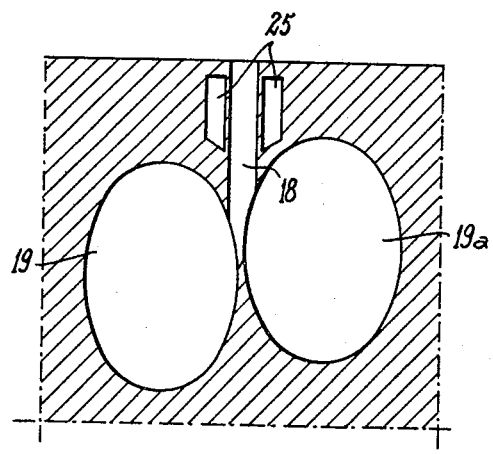
FIG. 5 is a section on the line II—II of FIG. 4, showing the cavities formed in the casing for housing the rotor members, the latter being omitted.

In the apparatus shown in FIG. 4, the general arrangement is similar to that shown in FIG. 1. Here however the rotor members 16 and 16a, rather than being true cones, are contoured as portions of hyperboloids of revolution terminating at their smaller ends or apices in rounded, e.g. hemispherical, end portions 15 and 15a coaxial with the hyperboloids. In this case the geometrical axes of the hyperboloidal members, which coincide with the axes of rotation of said members, and are shown at 21 and 21a, do not lie in a common plane as was the case in the conical rotor arrangement of FIG. 1. This is made necessary by the inherent geometrical properties of hyperboloidal surfaces, in order to allow said surfaces to be substantially tangential to each other along respective generatrices thereof, as will be clearly apparent from the view shown in FIG. 6. In this case, moreover, the cavities 19 and 19a formed in the casing for receiving the respective rotor members, as shown in FIG. 5, are somewhat displaced from each other to permit the requisite displacement between the axes of said members in accordance with the explanation just given. As in the case of the first embodiment the stator cavities 19 and 19a have inner surfaces which, throughout their major areas, conform snugly with the outer surfaces of the rotor members received in them, i.e. said cavity surfaces are generally hyperboloidal in form. Again however, the inner surfaces of the cavities are displaced away from the outer surfaces of the rotor members in an area surrounding the extrusion orifice 10, so as to provide a generally annular clearance space designated 23 in FIG. 4. The extrusion orifice 10 is positioned with its axis equidistant from the respective axes 21 and 21a of the rotor members and lying in a direction bi-secting the angle formed between said axes.

Figure 6:
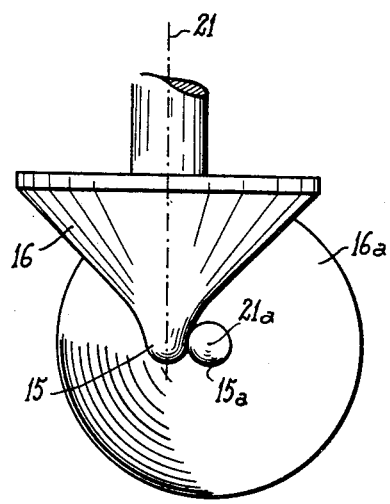
FIG. 6 is a separate view of the rotor members of FIG. 4 with one member shown with its axis normal to the plane of the drawing.

The embodiment shown in FIGS. 4 to 6 has certain advantages over the embodiment using conical rotor members. Thus, a pair of hyperboloidal surfaces when revolving in substantially tangential relationship to each other develop a substantial suction effect which serves more positively to impel the plastic material from the inlet to the extrusion orifice. At the same time, it is found that undesirable turbulence effects adjacent the apices of the rotor members as the material is about to enter the extrusion orifice, which effects otherwise tend to arise, are nearly completely eliminated with the rotor configuration shown in FIGS. 4 to 6. In other respects the construction shown in FIGS. 4 to 6 operates in a manner similar to that of the first embodiment and need not be described anew.

Figure 2:
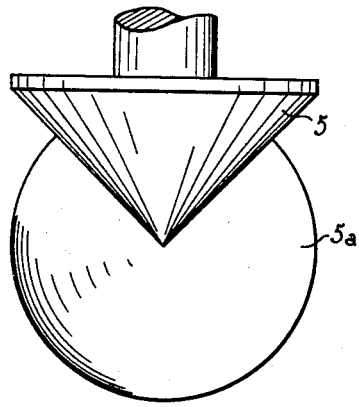
FIG. 2 is a separate view of the rotor members of FIG. 1 wherein one member is shown with its axis normal to the plane of the drawing.
Figure 3:
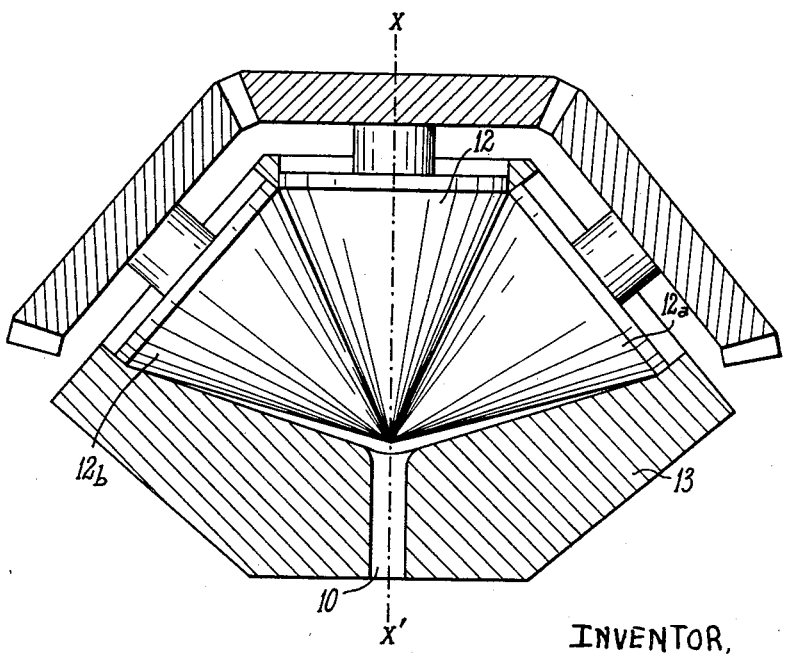
FIG. 3 is a fragmentary view illustrating an alternative form of the invention utilizing three cooperating rotor members.

It will be noted that in all of the constructions described the rotor members are positioned with their larger or base ends positioned adjacent the inlet, and their narrower or apical ends positioned adjacent the outlet or extrusion orifice. This is important in promoting a smooth and uniform feed of the plastic material through the apparatus. Strictly speaking the rotor members shown in the construction of FIG. 1 to FIG. 3 are conical, while the rotor members in the construction of FIGS. 4–6 are hyperboloidal, and they have been described as such in the foregoing disclosure. More broadly however, in all of the illustrated constructions the rotor members may be considered as being of "generally conical shape," in that the hyperboloidal members 16, 16a of FIG. 4 have a larger end or base and a narrower end or apex. It should be understood therefore that in the appended claims the term "generally conical surface" will sometimes be used to designate surfaces of revolution having larger and narrower ends, even though such surface is not necessarily a cone in the strict sense of the word.

Various changes and modifications, other than those explicitly mentioned hereinabove, may of course be conceived on the basis of the teachings given in the present specification without exceeding the scope of the present invention.

What I claim is:

1. Extrusion apparatus comprising a casing formed with at least a pair of intersecting cavities, inlet means connecting with said cavities for supplying extrudable material thereinto, an extrusion orifice spaced from said inlet means and connected with said cavities for extruding the material from the casing, rotor members positioned in the respective casings in the general form of conical surfaces mounted for rotation about their respective axes in substantially tangential relationship and having their larger ends positioned adjacent said inlet means and their smaller ends positioned adjacent said extrusion orifice, and means for simultaneously rotating said members for milling the material and extruding it through said office.

2. The apparatus claimed in claim 1 wherein said cavities have inner wall surfaces conforming substantially with the outer surfaces of said respective rotor members over a major extent of said inner wall surfaces, said inner wall surfaces being spaced away from said outer surfaces of the members in an area adjacent said extrusion orifice to provide a clearance space connecting with the orifice.

3. The apparatus claimed in claim 1, wherein said rotor members are in the form of cones.

4. The apparatus claimed in claim 1, wherein said rotor members are in the form of portions of hyperboloids of revolution.

5. An extrusion apparatus comprising a casing having a recess, means for feeding extrudable material into said recess, said casing having an outlet orifice, rotor means in said recess for milling said material and extruding it through said orifice, said rotor means comprising a pair of similar rotor members having conical surfaces mounted for rotation about their respective axes in substantially tangential relationship with their apices positioned adjacent said orifice, and means for rotating said members.

6. An extrusion apparatus as set forth in claim 5, wherein said rotor members are in the form of portions of hyperboloids of revolution each bounded at one end by a larger circumference and having a smaller apex at its other end with their apices adjacent said orifice.

7. An extrusion apparatus as set forth in claim 5 wherein said rotating means comprise gears secured to said members coaxially therewith, and a common drive gear meshing with said first-mentioned gears.

8. An extrusion apparatus as set forth in claim 5, wherein three rotor members are provided, two of said members being positioned in substantially tangential relationship with the third of said members.

References Cited in the file of this patent

UNITED STATES PATENTS

| | | |
|---|---|---|
| 1,777,923 | Johansson | Oct. 7, 1930 |
| 2,426,457 | Koch | Aug. 26, 1947 |
| 2,807,047 | Olson et al. | Sept. 24, 1957 |
| 2,908,226 | Rich et al. | Oct. 13, 1959 |

FOREIGN PATENTS

| | | |
|---|---|---|
| 769,895 | Great Britain | Mar. 13, 1957 |
| 339,890 | Italy | Apr. 29, 1936 |